US012790045B2

(12) United States Patent
Brandsetter et al.

(10) Patent No.: US 12,790,045 B2
(45) Date of Patent: Nov. 10, 2026

(54) VOID IDENTIFICATION FOR PACKAGING AND APPARATUSES AND METHODS FOR USING VOID IDENTIFICATION

(71) Applicant: Intertape Polymer Corp., Sarasota, FL (US)

(72) Inventors: Scott Brandsetter, Green Cove Springs, FL (US); William Corbello, Pearland, TX (US); Mark McCrate, New Haven, CT (US)

(73) Assignee: INTERTAPE POLYMER CORP., Sarasota, FL (US)

( * ) Notice: Subject to any disclaimer, the term of this patent is extended or adjusted under 35 U.S.C. 154(b) by 0 days.

(21) Appl. No.: 19/048,652

(22) Filed: Feb. 7, 2025

(65) Prior Publication Data

US 2025/0178759 A1 Jun. 5, 2025

Related U.S. Application Data

(63) Continuation of application No. 17/900,422, filed on Aug. 31, 2022, now abandoned.

(Continued)

(51) Int. Cl.

*B65B 1/06* (2006.01)
*B65B 43/52* (2006.01)
*G06K 7/10* (2006.01)

(52) U.S. Cl.

CPC ................ *B65B 1/06* (2013.01); *B65B 43/52* (2013.01); *G06K 7/10445* (2013.01)

(58) Field of Classification Search

CPC .......... B65B 43/52; B65B 55/20; B65B 1/06; B65B 1/30; B65B 57/10; G06K 7/10445

See application file for complete search history.

(56) References Cited

U.S. PATENT DOCUMENTS 5,829,231 A 11/1998 Harding et al.
7,337,595 B2 3/2008 Harding (Continued)

FOREIGN PATENT DOCUMENTS

EP 2509875 B1 8/2015
JP 2020535090 A 12/2020

OTHER PUBLICATIONS

Translation of JP-2020535090 A (Year: 2020).*

*Primary Examiner* — Thomas M Wittenschlaeger

(74) *Attorney, Agent, or Firm* — Jeffrey R. Gray; Moore & Van Allen PLLC

(57) ABSTRACT

A void fill system may be used to scan a carton before, during, or after pre-fill material is dispensed into the carton, one or more products are packaged into the carton, and/or when void fill material is dispensed to the carton having the one or more products. The void fill system may include one or more sensors, which may be used identify the carton and/or identify the carton volume. The one or more sensors may also be used to identify the current carton volume (e.g., of the products, fill material, etc.). The information captured by the void fill system may be used to determine a proposed packaging recipe (e.g., suggest a carton, void fill, product configuration, etc.) based on supplier or customer preferences, product information, shipping information, or the like, to provide a notification with recommendations regarding the packaging process, and/or to automatically dispense void fill material.

20 Claims, 12 Drawing Sheets

Related U.S. Application Data

(60) Provisional application No. 63/238,962, filed on Aug. 31, 2021.

(56) References Cited

U.S. PATENT DOCUMENTS

| | | | |
|---|---|---|---|
| 7,584,592 B2 | 9/2009 | Gabrielson et al. | |
| 7,788,883 B2 | 9/2010 | Buckley et al. | |
| 7,814,733 B2 | 10/2010 | Carlson et al. | |
| 8,087,218 B2 | 1/2012 | Harding | |
| 8,340,812 B1 | 12/2012 | Tian et al. | |
| 8,683,777 B2 | 4/2014 | Armington et al. | |
| 9,102,429 B2 | 8/2015 | Corradi et al. | |
| 9,235,822 B2 | 1/2016 | Tian et al. | |
| 9,403,612 B2 | 8/2016 | Carlson et al. | |
| 9,533,776 B2 | 1/2017 | Konnerth | |
| 9,612,583 B1 * | 4/2017 | Qaddoura | G05B 19/128 |
| 9,779,546 B2 | 10/2017 | Hunt et al. | |
| 9,914,278 B2 | 3/2018 | Pettersson et al. | |
| 9,994,346 B2 | 6/2018 | Carlson et al. | |
| 10,227,171 B2 | 3/2019 | Wetsch et al. | |
| 10,293,962 B2 | 5/2019 | Weinmann et al. | |
| 10,850,906 B2 | 12/2020 | Eckel | |
| 2008/0092488 A1 | 4/2008 | Gabrielsen et al. | |
| 2009/0277139 A1 | 11/2009 | Eckel | |
| 2011/0197550 A1 | 8/2011 | Carlson et al. | |
| 2011/0308204 A1 | 12/2011 | Corradi et al. | |
| 2014/0157729 A1 | 6/2014 | Weinmann et al. | |
| 2016/0257474 A1 | 9/2016 | Eckel | |
| 2017/0008654 A1 | 1/2017 | Boothman et al. | |
| 2020/0180804 A1 | 6/2020 | Slovencik et al. | |
| 2022/0063914 A1 * | 3/2022 | Langen | B65G 1/0464 |
| 2022/0162012 A1 * | 5/2022 | Nokelby | B65G 43/08 |
| 2022/0165114 A1 * | 5/2022 | Moller Domínguez | B67D 7/02 |

* cited by examiner

VOID IDENTIFICATION FOR PACKAGING AND APPARATUSES AND METHODS FOR USING VOID IDENTIFICATION

CROSS REFERENCE AND PRIORITY CLAIM UNDER 35 U.S.C. § 119

This application claims priority to U.S. application Ser. No. 17/900,422 entitled "Void Identification for Packaging Apparatuses and Methods for Using Void Identification" filed on Aug. 31, 2022, which claims priority to U.S. Provisional Application No. 63/238,962 entitled "Void Identification for Packaging and Apparatuses and Methods for Using Void Identification" filed on Aug. 31, 2021, all of which are assigned to the assignee hereof and the entirety of which are incorporated by reference herein.

FIELD

The present disclosure relates generally to a cartoning machine. More specifically, a void fill system of a cartoning machine that is utilized to aid in optimizing the packaging of a product(s) in a carton.

BACKGROUND

A cartoning machine is a type of packaging machine that may use various components in order to select and/or form a carton, fill a carton with a product, such as a food, supplement, pharmaceutical, consumer item, or other goods, fill the carton with void fill to protect the product, close the carton, apply a label, send the carton for shipping, or the like.

BRIEF SUMMARY

A void fill system may be used to scan a carton before, during, and/or after pre-fill material is dispensed into the carton (e.g., void fill material may be dispensed into a carton before products are packaged), one or more products are packaged into the carton, and/or when void fill material is dispensed to the carton having the one or more products. In particular, the carton may be scanned after the products are packaged into the carton (e.g., with or without any pre-fill material). The void fill system may comprise one or more sensors (e.g., one or more cameras, lasers, infrared devices, radar, LIDAR, light curtains, code readers—QR, barcode, scanners, or the like—, RFID sensor, or the like), which may be used identify the carton (e.g., in order to identify a pre-stored carton size, such as volume, or the like) and/or identify the carton volume directly (e.g., identify the maximum carton volume from information captured by the sensors, such as by a scan). The one or more sensors may also be used to identify the current carton volume (e.g., after pre-fill material is added, with the one or more products, and/or with fill material added after the one or more products are included in the carton).

The information captured by the void fill system may be used to determine a proposed packaging recipe (e.g., suggest a carton, suggest void fill amount—pre-fill and/or fill material after packing a product, suggest void fill type, suggest how much to fill an air filled maters, suggest different product configuration within a carton, suggest shipping in original packaging, or the like) based on supplier preferences, customer preferences, product information, shipping information, or the like. The void fill system may also provide a notification to a user located on-site with recommendations regarding how to package the carton (e.g., void fill type, void fill amount, or the like). Alternatively, the void fill system may also provide a notification to a user located off-site in order to allow the user to analyze the information and provide recipe recommendations. In some implementations, the void fill system may also communicate with one or more void fill material dispensers to automatically dispense void fill material (e.g., void fill type, void fill amount, or the like) to the carton. Various embodiments of the implementation of the void fill system will be described in further detail herein.

While cartons may be described and illustrated herein as being a box (e.g., corrugated paper box, or the like), it should be understood that the cartons may be made of any type of material and may have any type of shape. Moreover, the cartons may be ridged, flexible, or a combination thereof. As such, the cartons may be any type of ridged or flexible box, container, pouch, mailer, bag, or the like with or without flaps for closing the carton.

One embodiment of the invention is a material fill system to aid in filling packaging cartons. The system comprises one or more sensors, one or more memory devices with computer-readable program code stored thereon, and one or more processing devices operatively coupled to the one or more memory devices and the one or more sensors. The one or more processing devices are configured to execute the computer-readable program code to receive a carton volume for a carton, identify a current carton volume of the carton using the one or more sensors, and determine a void fill amount based on the carton volume and the current carton volume.

In further accord with embodiments, the carton volume is a maximum fill volume of the carton.

In other embodiments, receiving the carton volume comprises identifying a carton height, a carton length, and a carton width using the one or more sensors.

In yet other embodiments, identifying the carton height comprises identifying a position of one or more flap folds between one or more flaps and one or more walls of the carton using the one or more sensors, and identifying a distance between the one or more flap folds and a bottom edge of the carton or support surface on which the carton sits.

In still other embodiments, identifying the carton length and the carton width comprises identifying two or more edges of an opening of the carton using the one or more sensors, wherein the one or more sensors are one or more overhead sensors, and identifying the carton length and the carton width based on a measurement of the two or more edges of the opening of the carton.

In other embodiments, receiving the carton volume comprises identifying a carton identifier using the one or more sensors, accessing stored carton identifiers that correspond to a plurality of cartons, comparing the carton identifier with the stored carton identifiers, and identifying a dedicated carton as the carton. The carton volume is determined for the dedicated carton when the carton identifier meets a stored carton identifier from the stored carton identifiers.

In further accord with embodiments, the carton identifier may comprise a carton length, a carton height, a carton width, a carton tag, a carton label, a carton barcode, a carton QR code, a carton RFID tag, a carton character, or a carton color.

In other embodiments, receiving the carton volume comprises receiving a redundant carton selection and determining the carton volume for the redundant carton.

In yet other embodiments, identifying the current carton volume of the carton comprises identifying a product volume for one or more products in the carton using the one or more sensors.

In still other embodiments, identifying the current carton volume of the carton comprising identifying a pre-fill material volume for pre-fill material in the carton.

In other embodiments, determining the void fill amount comprises taking a difference between the carton volume and the current carton volume.

In further accord with embodiments, determining the void fill amount is further based on a recipe.

In other embodiments, the recipe has recipe characteristics comprising a suppler packing the carton, a customer receiving the carton, a fill type, a carton type, or product information.

In yet other embodiments, the recipe comprises an increase or decrease of the void fill amount based on supplier preference or customer preference.

In still other embodiments, the one or more processing devices are further configured to execute the computer-readable program code to send a void fill dispensing request to a void fill dispenser for the void fill amount. The void fill dispenser dispenses the void fill amount.

In other embodiments, the one or more processing devices are further configured to execute the computer-readable program code to send a void fill notification to a user computer system or a cartoning computer system. The void fill notification comprises the void fill amount.

In further accord with embodiments the one or more processing devices are further configurated to execute the computer-readable program code to send a void fill notification to a user computer system. The void fill notification comprises a recommended void fill amount, a recommended void fill type, a recommended carton, a recommended product configuration.

In other embodiments, the one or more sensors comprise a camera, a laser, a light curtain, radar, LiDAR, infrared, a near-field communication device, or a RFID detector.

Another embodiment of the invention comprises a cartoning machine. The cartoning machine comprises a carton transport system for transporting a carton, and a material fill system. The material fill system comprising one or more sensors, one or more memory devices with computer-readable program code stored thereon, and one or more processing devices operatively coupled to the one or more memory devices and the one or more sensors. The one or more processing devices are configured to execute the computer-readable program code to receive a carton volume for the carton, identify a current carton volume of the carton using the one or more sensors, and determine a void fill amount based on the carton volume and the current carton volume.

Another embodiment of the invention comprises a computer-implemented method for using a material fill system having one or more processors operatively coupled to one or more sensors. The computer-implemented method comprising receiving, by the one or more processors, a carton volume of a carton, identifying, by the one or more processors, a current carton volume of the carton using the one or more sensors, and determining a void fill amount based on the carton volume and the current carton volume.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

The following figures (sometimes abbreviated as "FIG." or "FIGS." herein) will now be described by way of example, not by way of limitation, in which.

Figure 1:
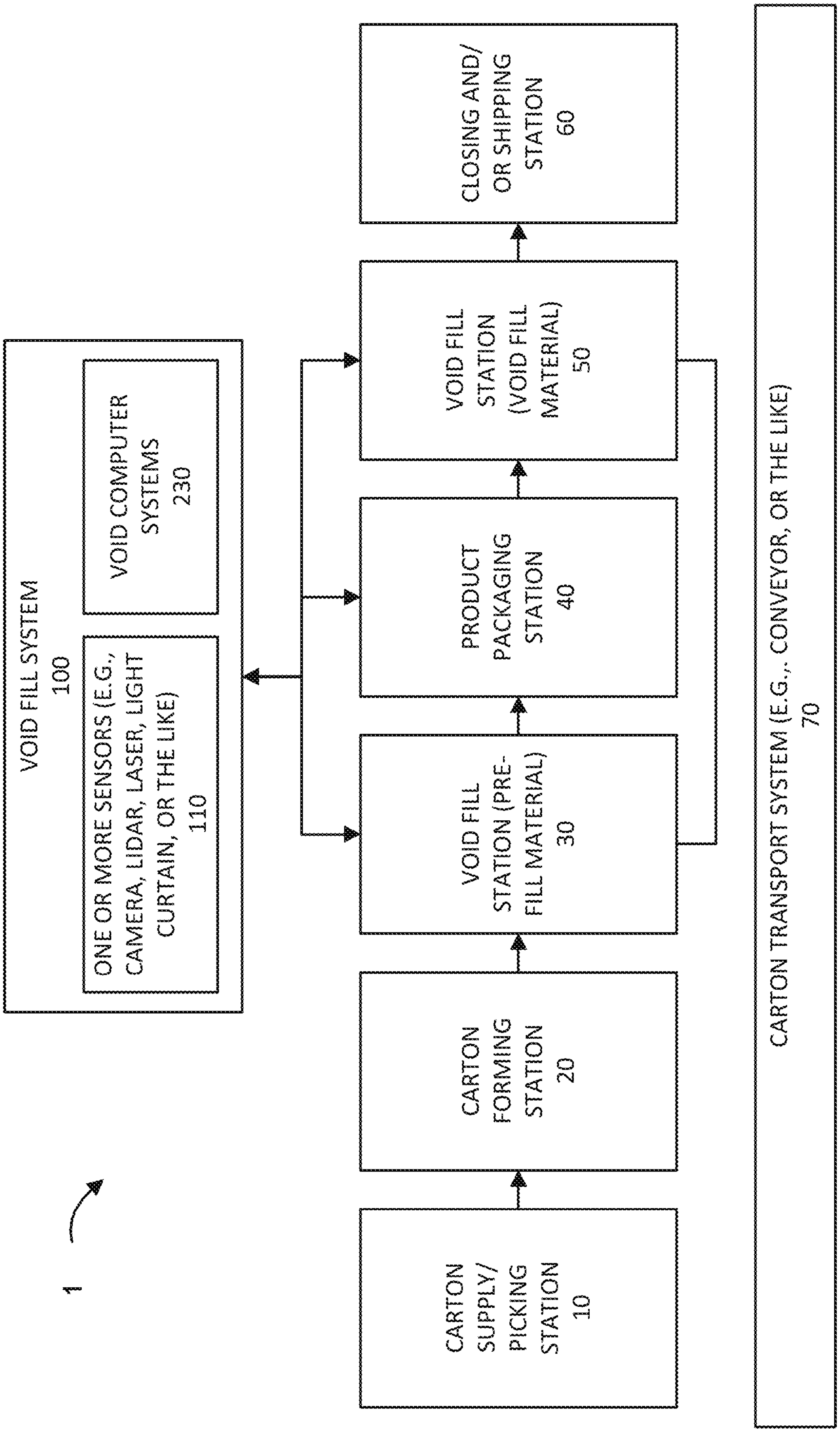
FIG. 1 illustrates a schematic view of a cartoning apparatus with the void fill system, in accordance with embodiments of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While this disclosure is susceptible to embodiments in many different forms, there is shown in the drawings and will herein be described in detail embodiments of the present disclosure with the understanding that the present disclosure is to be considered as an exemplification of the principles of the present disclosure and is not intended to limit the broad aspect of the present disclosure to the embodiments illustrated.

FIG. 1 illustrates a cartoning apparatus 1 (otherwise described as a "cartoning machine") in a schematic form. The cartoning apparatus 1, may have one or more of the stations and/or systems illustrated in FIG. 1, and as such the void fill system 100 (e.g., otherwise described as a material fill system 100, or the like) may be utilized with any type of carton packaging process. As illustrated in FIG. 1, the cartoning apparatus 1 may include a carton supply and/or picking station 10 that allows for selection of a carton 4 from one or more cartons 4 (e.g., from one or more magazines of stacked cartons, or other like carton supply station—not illustrated). For example, a carton 4 is selected having one or more carton properties (e.g., size, shape, printing on the carton—marketing materials for a product or an entity shipping information, or the like—, orientation, opening location, ridged, flexible, carton material, cushioning material, insulated, or the like) for packaging one or more products 6 in the carton 4. The one or more carton properties may be defined as carton information, which may include one or more carton identifiers that may be used to identify and/or select a carton with one or more carton properties.

In some embodiments, a carton forming station 20 may open the carton 4. For example, when the carton 4 is in a blank form, the carton is formed (e.g., opened, folded, expanded, taped on the bottom, sealed, or the like) for packaging the one or more products 6. The carton picking station 10 and/or the carton forming station 20 may be automated stations, manual stations, and/or a combination thereof that allows for one or more cartons 4 (e.g., a unique carton, a dedicated carton from a plurality of cartons, a single repetitive carton, or the like) having one or more carton attributes to be selected for one or more products 6. For example, in some embodiments an automated machine (e.g., robot, or the like) may pick a carton 4 having a particular carton attribute (and in some embodiments form the carton) in order to fill the carton 4 with a particular product 6. In other embodiments, a worker may manually select a carton 4 and/or form the carton 4. While in still other embodiments a robot may pick the carton 4 and deliver it to a worker to form the carton (or vice versa).

As further illustrated in FIG. 1, in some embodiments the carton 4 may be directed to one or more void fill stations 30, 50 (e.g., otherwise described as material fill stations 30, 50) having void fill dispensers (e.g., otherwise described as material fill dispensers), which allow for automatic and/or manual dispensing of fill material (e.g., void fill material 2, pre-fill material, or the like). For example, a first void fill station 30 may be used for dispensing pre-fill material (e.g., dispensing cushioning material to the empty carton before the products 6 and/or additional void fill material are inserted into the carton 4). The pre-fill material may be the same as or different than void fill material that will be dispensed to the carton after the products 6 are inserted into the carton 4 (e.g., paper, such as crushed paper, air filled paper, or the like, air pillows, air bubbles, peanuts, thermal insulation, or any other like fill material). In some embodiments, a pre-fill material amount may be based on a packaging recipe (e.g., supplier or customer preferences, fill type, product type, product size, carton type, or the like), which will be described in further detail herein. The pre-fill material for a carton 4 may be optional and/or may occur before or after the carton is passed through the void fill system 100, or one or more sensors of the void fill system 100. Moreover, as will be described in further detail herein, the one or more void fill stations 30, 50 with the void fill dispenser may automatically, manually, or combination thereof, fill the carton 4.

As further illustrated in FIG. 1, the cartoning apparatus 1 may also comprise a product packaging station 40. The product packing station 40 may automatically and/or manually allow for filling of a carton 4 with one or more products 6 (e.g., a food, supplement, pharmaceutical, consumer item, or other goods). The product packaging station 40 may be supplied with one or products automatically and/or manually from a product supply system (not illustrated). The product supply system may have machinery and/or product computer systems that are used to supply products to the product packaging station 40 and in some embodiments communicate with other computer systems as ill be described herein with respect to FIG. 2.

It should be understood that the void fill system 100 may be used to scan the carton 4 before, during, or after the carton 4 is optionally filled with pre-fill material, the one or more products 6 are packaged (e.g., placed into the carton 4, or the like), and/or void fill material is added to the carton 4 having the products 6. However, in particular embodiments, after the carton 4 is filled with one or more products 6, the carton 4 may pass the void fill system 100. As illustrated in FIG. 1, the void fill system 100 may comprise one or more sensors 110 (e.g., one or more cameras, lasers, infrared devices, LIDAR, light curtains, code (e.g., barcode, QR code, or the like), RFID, or the like), which may be used for various purposes. For example, as will be described in further detail herein, the one or more sensors 110 may be utilized to identify the carton 4 (e.g., in order to determine the carton volume, size, or other like carton attribute from pre-stored carton information, directly from measurements of the carton, or the like) and/or identify the current carton volume, which may be based on any pre-fill material, the products 6, or the like, located in the carton 4 during a scan. Moreover, as will be described in further detail with respect to FIG. 2, the void fill system 100 may comprise one or more void computer systems 230 (e.g., having computer processors, and the like) that allow for communication with cartoning computer systems 210, user computer systems 220, or other systems (e.g., product supply systems, carton supply systems, void dispensing systems, or the like) in order to optimize the packaging of the products 6 in the carton 4. As such, the void fill system 100 may communicate with the cartoning computer systems 210, the user computer systems 220, and/or other systems 240 to provide void fill material recommendations (e.g., custom fill material recipe—pre-fill amount, pre-fill types, void fill amount, void fill type, or the like), dispense fill material (e.g., automatically from a void fill dispenser), and/or to provide recommendations for packaging products (e.g., custom recipe), as will be described in further detail herein.

While the void fill system 100 may use the one or more sensors 110 to scan a carton 4 after the carton 4 is filled with a product 6, the void fill system 100 may be used before a first void fill station 30 (e.g., to determine the carton 4 type, size, or the like) and/or before the product packing station 40 (e.g., to determine any pre-fill material in the carton). While a first void fill station 30 and a second void fill station 50 may be different stations, in some embodiments the first void fill station 30 and the second void fill station 50 may be the same station and/or have components (e.g., sensors 110, or the like) located at different stations.

As illustrated in FIG. 1, after the carton 4 is filled with the product 6 and the void fill material 2, the carton 4 may be sent to one or more closing and/or shipping stations 60, which may automatically and/or manually close the carton 2 (e.g., close flaps and seal, for example, with tape), apply a label (e.g., branding, shipping label, or the like), and send the carton 4 for further processing and/or shipping.

It should be understood that in some embodiments the cartoning machine 1 may be a semi-automated process in which one or more of the stations includes automated machinery, such as automated dispensers in the fill station(s) 30, 50 and a user working at a table packaging products 6. In other embodiments, the semi-automated process may include a carton transport system 70 (e.g., a conveyor, such as a belt conveyor, roller conveyor, or other transport system) that moves the cartons 4 between the various stations and a user aids in the packaging process. In other embodiments, the cartoning machine 1 may be a fully automated process in which machinery automatically picks the cartons 4, forms the cartons 4, provides pre-fill material (optionally), packages the products 6 in the cartons 4, provides the void fill material after packaging, seals the cartons 4, labels the cartons, and/or ships the cartons 4, or the like. However, it should be understood that in some embodiments of the cartoning machine 1, some or all of the stations include manual processes (e.g., manual carton picking and forming, manual void fill dispensers, manual packaging, manual closing and/or shipping, or the like). Regardless of the type and operation of the cartoning machine 1, the void fill system 100 may be used with any type of cartoning process, and as such, may operate independently from the cartoning machine 1 or may be integrated with the any one or more of the stations of the cartoning machine 1.

Figure 2:
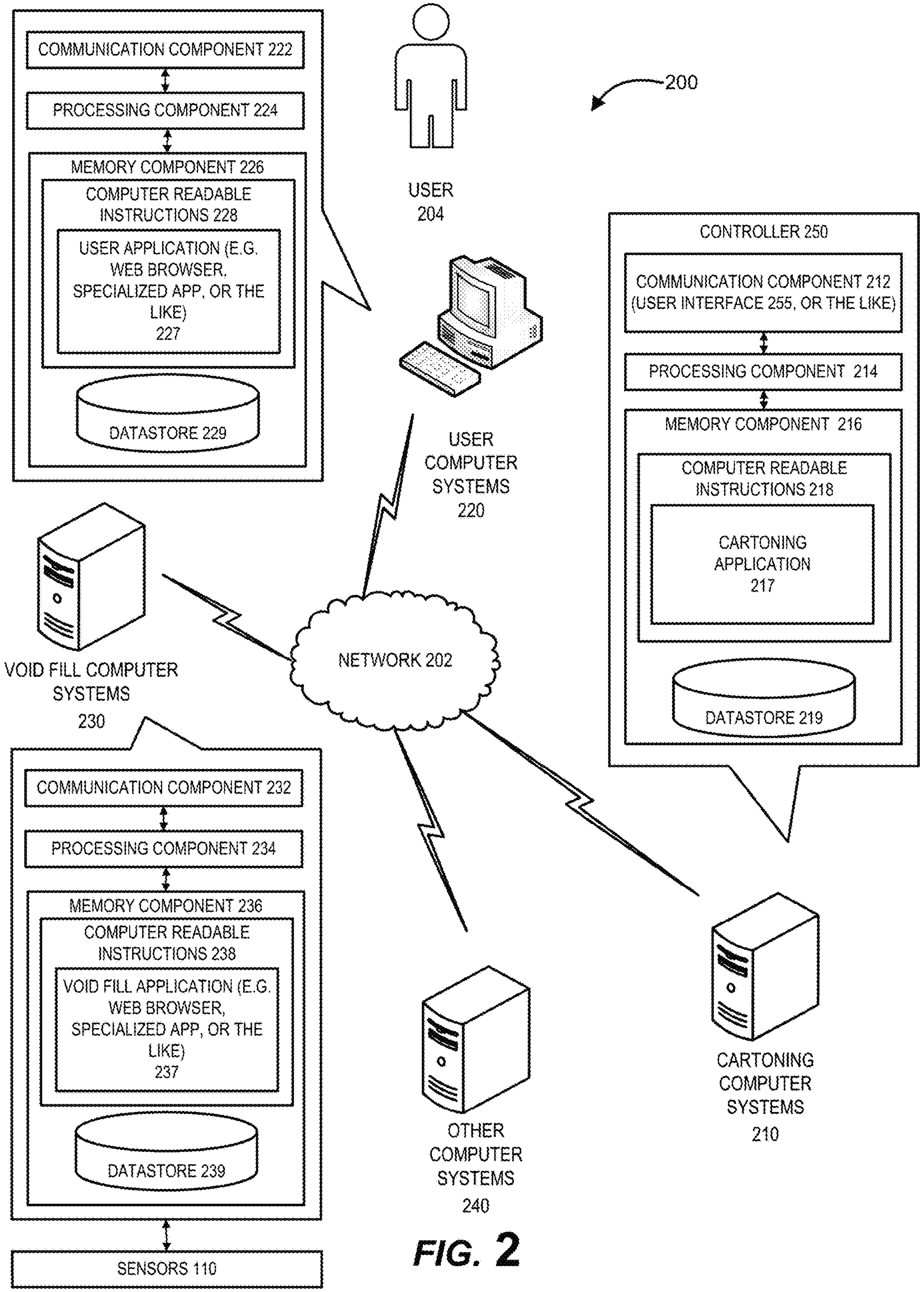
FIG. 2 illustrates a cartoning network, in accordance with embodiments of the present disclosure.

FIG. 2 illustrates a cartoning network 200, in accordance with embodiments of the present disclosure. As illustrated in FIG. 2, one or more cartoning computer systems 210 are operatively coupled, via a network 202, to one or more user computer systems 220, one or more void fill computer systems 230, and/or one or more other systems (not illustrated). In this way, the cartoning computer systems 210 operating the cartoning machine 1 may communicate with one or more user computer systems 220, one or more void fill computer systems 230, and/or one or more other computer systems 240 (e.g., product supply computer systems, carton supply computer systems, fill dispenser computer systems, third-party computer systems, or the like) for determining the voids in the carton 4, recommended fill material, dispensing fill material, and/or sending notifications to users regarding the packaging process (e.g., recommended recipe, or the like), as will be described in further detail herein. Moreover, the cartoning computer systems 210 may communicate with user computer systems 220 to allow the user computer systems 220 to monitor and/or control the cartoning machine 1, locally and/or remotely. While the computer systems 210, 220, 230, 240 are illustrated as separate systems, it should be understood that two or more of the systems may be combined such that the system operates as single system, and/or the individual systems 210, 220, 230, 240 may be split into additional systems.

The communications between the systems 210, 220, 230, 240 may occur over a network 202. The network 202 may be a global area network (GAN), such as the Internet, a wide area network (WAN), a local area network (LAN), or any other type of network or combination of networks. The network 202 may provide for wireline, wireless, or a combination of wireline and wireless communication between systems, servers, components, and/or devices on the network 202.

As illustrated in FIG. 2, the one or more cartoning computer systems 210 may comprise a controller 250 that may generally comprise one or more communication components 212, one or more processing components 214, and one or more memory components 216. The one or more processing components 214 are operatively coupled to the one or more communication components 212, and the one or more memory components 216. As used herein, the term "processing component" generally includes circuitry used for implementing the communication and/or logic functions of a particular system. For example, a processing component may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components may include functionality to operate one or more software programs based on computer-readable instructions thereof, which may be stored in the one or more memory components.

The controller 250 components, such as the one or more communication components 212, may be operatively coupled to the void fill computer systems 230 and/or the sensors 110 of the void fill system 100. The one or more processing components 214 use the one or more communication components 212 to communicate with the network 202 and other components on the network 202, such as, but not limited to, the components of the one or more user computer systems 220, the one or more void fill computer systems 230, and/or the one or more other computer systems 240. As such, the one or more communication components 212 generally comprise a wireless transceiver, modem, server, electrical connection, electrical circuit, or other component for communicating with other components on the network 202. The one or more communication components 212 may further include an interface that accepts one or more network interface cards, ports for connection of network components, Universal Serial Bus (USB) connectors, or the like. Moreover, the one or more communication components 212 may include a keypad, keyboard, touchscreen, touchpad, microphone, mouse, joystick, other pointer component, button, soft key, and/or other input/output component(s) for communicating with the users 204. In some embodiments, as described herein the one or more communication components 212 may comprise a user interface, such as a graphical user interface that allows a user to control and/or monitor the operation of the cartoning machine 1.

As further illustrated in FIG. 2, the one or more cartoning computer systems 210 comprise computer-readable instructions 218 stored in the one or more memory components 216, which in some embodiments includes the computer-readable instructions 218 of the one or more cartoning applications 217 (e.g., used to operate the cartoning machine 1 and/or the machinery thereof, or the like). In some embodiments, the one or more memory components 216 include one or more data stores 219 for storing data related to the cartoning machines 1, including, but not limited to, data created, accessed, and/or used by the one or more cartoning systems 210 to operate the one or more cartoning machines 1.

As illustrated in FIG. 2, users 204 may communicate with each other over the network 202 and the cartoning computer systems 210, the void fill computer systems 230, and/or other computer systems 240 in order to control and/or monitor the various systems locally and/or remotely. Consequently, the one or more users 204 may be employees, agents, representatives, officers, contractors, vendors, clients, or the like of an organization operating the facility and/or the systems thereof (e.g., the void fill systems 100, or the like). The one or more user computer systems 220 may be a desktop, laptop, tablet, mobile device (e.g., smartphone device, or other mobile device), or any other type of computer that generally comprises one or more communication components 222, one or more processing components 224, and one or more memory components 226.

The one or more processing components 224 are operatively coupled to the one or more communication components 222, and the one or more memory components 226. The one or more processing components 224 use the one or more communication components 222 to communicate with the network 202 and other components on the network 202, such as, but not limited to, the one or more cartoning computer systems 210, the one or more product systems 230, and/or the other systems (not illustrated). As such, the one or more communication components 222 generally comprise a wireless transceiver, modem, server, electrical connection, or other component for communicating with other components on the network 202. The one or more communication components 222 may further include an interface that accepts one or more network interface cards, ports for connection of network components, Universal Serial Bus (USB) connectors and the like. Moreover, the one or more communication components 222 may include a keypad, keyboard, touch-screen, touchpad, microphone, mouse, joystick, other pointer component, button, soft key, and/or other input/output component(s) for communicating with the users. In some embodiments, the one or more communication components 222 may comprise a user interface, such as a graphical user interface that allows a user to, locally or remotely, control and/or monitor the operation of one or more portions of the cartoning machine 1.

As illustrated in FIG. 2, the one or more user computer systems 220 may have computer-readable instructions 228 stored in the one or more memory components 226, which in some embodiments includes the computer-readable instructions 228 for user applications 227, such as dedicated applications (e.g., apps, applet, or the like), portions of dedicated applications, a web browser or other apps that allow access to applications located on other systems, or the like. In some embodiments, the one or more memory components 226 include one or more data stores 229 for storing data related to the one or more user computer systems 220, including, but not limited to, data created, accessed, and/or used by the one or more user computer systems 220. The user application 227 may use the applications of the one or more cartoning computer systems 210, the one or more void fill computer systems 230, and/or one or more other computer systems 240 in order to communicate with other systems on the network 202 and take various actions described herein (e.g., operation, use, monitoring, or the like the cartoning machine 1).

Moreover, as illustrated in FIG. 2, the one or more void fill computer systems 230 may communicate with the cartoning computer systems 210, the user computer systems 220, and/or other computer systems 240 in order to capture information from the cartoning machine 1, the carton 4, and/or the products 6. In response the void fill computer systems 230 may analyze the packaging process, provide instructions to dispense void fill material to the carton 4, and/or provide notifications locally and/or remotely to users 204 to improve the packaging process. Consequently, the one or more void fill computer systems 230 may generally comprise one or more communication components 232, one or more processing components 234, and one or more memory components 226. Furthermore, the void fill computer systems 230 may comprise and/or communicate with one or more sensors 110.

The one or more processing components 234 are operatively coupled to the one or more communication components 232, and the one or more memory components 236. The one or more processing components 234 use the one or more communication components 232 to communicate with the network 202 and other components on the network 202, such as, but not limited to, the one or more cartoning computer systems 210, the one or more user computer systems 230, and/or the other computer systems 240. As such, the one or more communication components 232 generally comprise a wireless transceiver, modem, server, electrical connection, or other component for communicating with other components on the network 202. The one or more communication components 232 may further include an interface that accepts one or more network interface cards, ports for connection of network components, Universal Serial Bus (USB) connectors and the like. Moreover, the one or more communication components 232 may include a keypad, keyboard, touch-screen, touchpad, microphone, mouse, joystick, other pointer component, button, soft key, and/or other input/output component(s) for communicating with the users 204. In some embodiments, the one or more communication components 232 may comprise a user interface, such as a graphical user interface that allows a user to locally or remotely control and/or monitor the operation of the void fill systems 100.

As illustrated in FIG. 2, the one or more void fill computer systems 230 may have computer-readable instructions 238 stored in the one or more memory components 236, which in some embodiments includes the computer-readable instructions 238 for a void fill application 237, such as dedicated applications (e.g., apps, applet, or the like), portions of dedicated applications, a web browser or other apps that allow for scanning of a carton 2 or products 4, dispensing void fill material 6, and/or providing notifications to users 202 regarding the packaging process. In some embodiments, the one or more memory components 236 include one or more data stores 239 for storing data related to the one or more void fill computer systems 230, including, but not limited to, data created, accessed, and/or used by the one or more void fill computer systems 230. The void fill application 237 may communicate with the applications of the one or more cartoning computer systems 210, the one or more user computer systems 230, and/or one or more other computer systems 240 in order to communicate with other systems on the network 202 and take various actions described herein (e.g., operation, use, monitoring, dispensing, notifications, or the like for the cartoning machine 1 or the systems thereof).

Furthermore, the other computer systems 240 (e.g., carton supply computer systems, product supply computer systems, fill dispenser computer systems, shipping computer systems, third-party computer systems, or the like) have components the same as or similar to the components described with respect to the one or more cartoning computer systems 210, the one or more user computer systems 220, and/or the one or more void fill computer systems 230 (e.g., one or more communication components, one or more processing components, one or more sensors, one or more memory devices with computer-readable instructions of one or more product applications, one or more datastores, or the like). Thus, the one or more other computer systems 230 communicate with the one or more cartoning computer systems 210, the one or more user computer systems 220, and/or one or more void fill computer systems 230 in same or similar way as previously described with respect to the one or more cartoning systems 210, the one or more user computer systems 220, and/or the one or more void fill computer systems 230. The one or more carton supply systems may comprise the systems that allow the machinery to produce, select, form, transfer the cartons 4 throughout the cartoning machine 1. The one or more product supply computer systems may comprise the systems that operate the machinery that produce and/or supply the one or more products to the cartoning machine 1. The one or more fill dispenser computer systems may comprise the systems that dispense the fill material (e.g., pre-fill, post product fill, or the like). The one or more shipping computer system comprise the systems that label, transport, ship, or the like the filled cartons 4.

Figure 3:
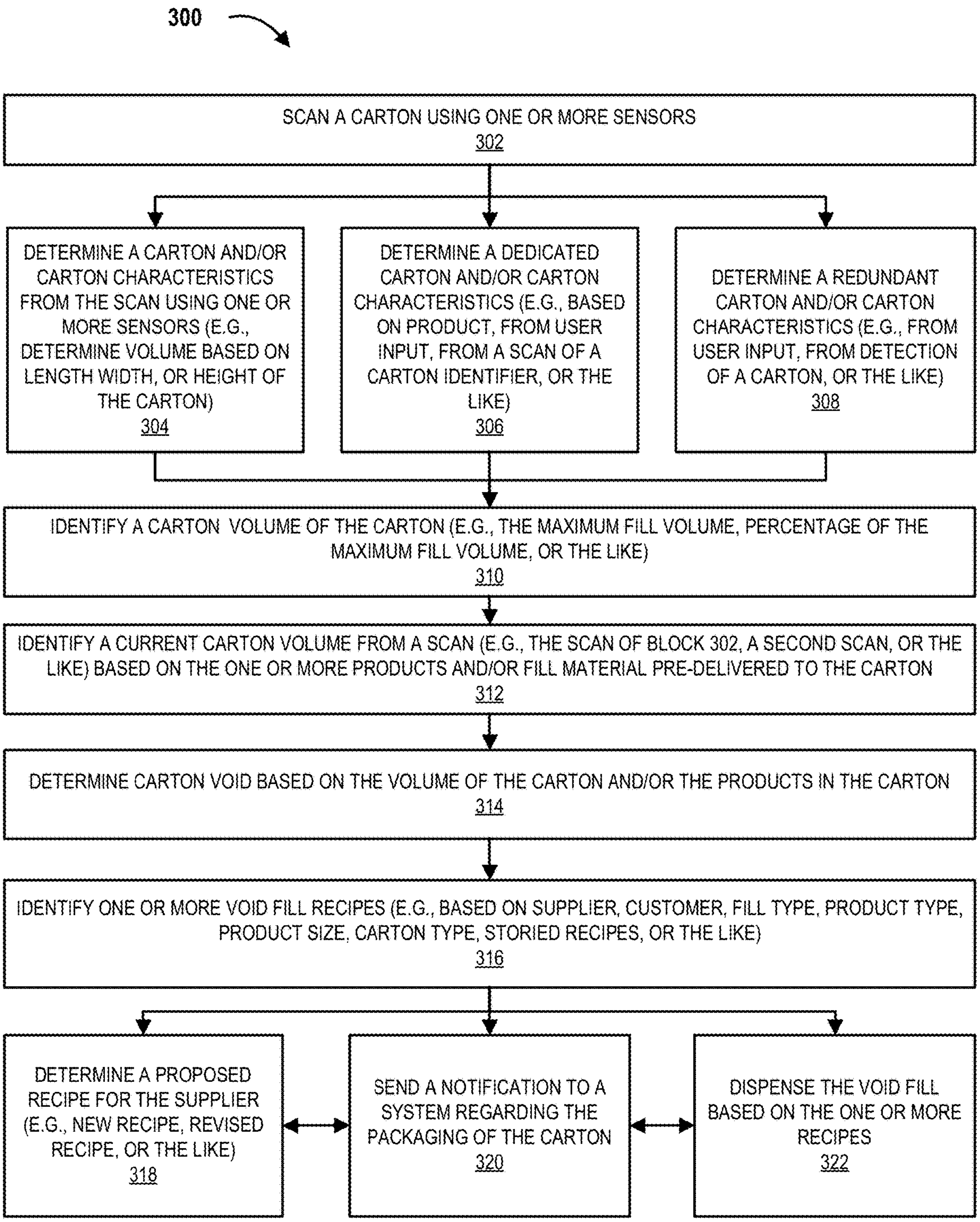
FIG. 3 illustrates a process flow for packaging a carton, in accordance with embodiments of the present disclosure.
Figure 4:
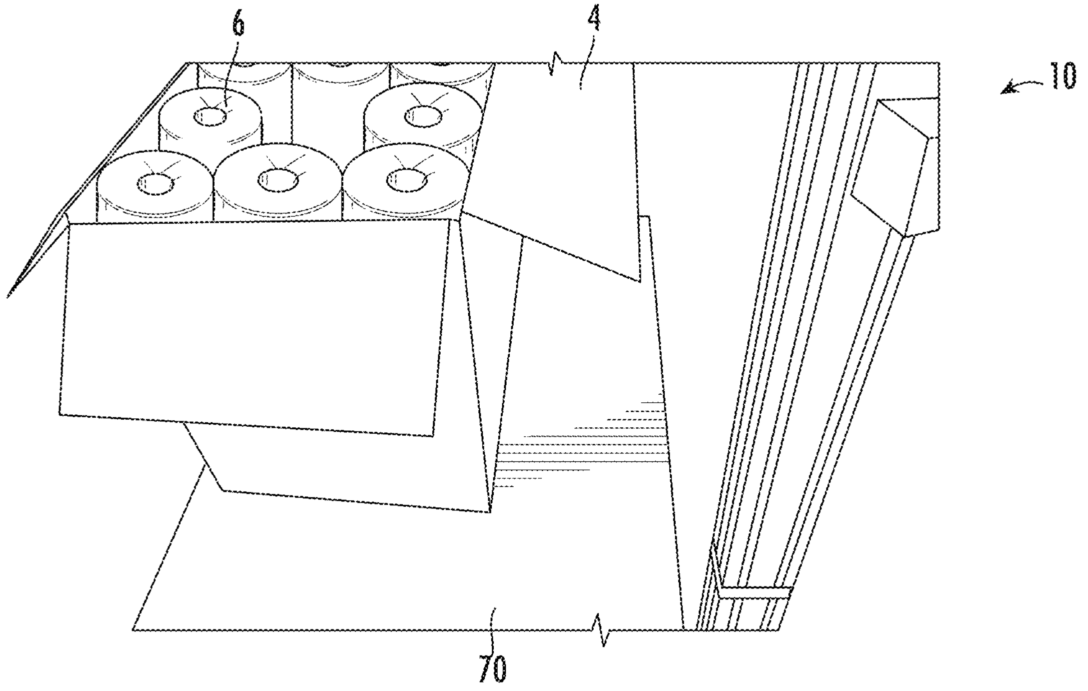
FIG. 4 illustrates a perspective view of a carton moving down a conveyor belt for scanning, in accordance with embodiments of the present disclosure.
Figure 5:
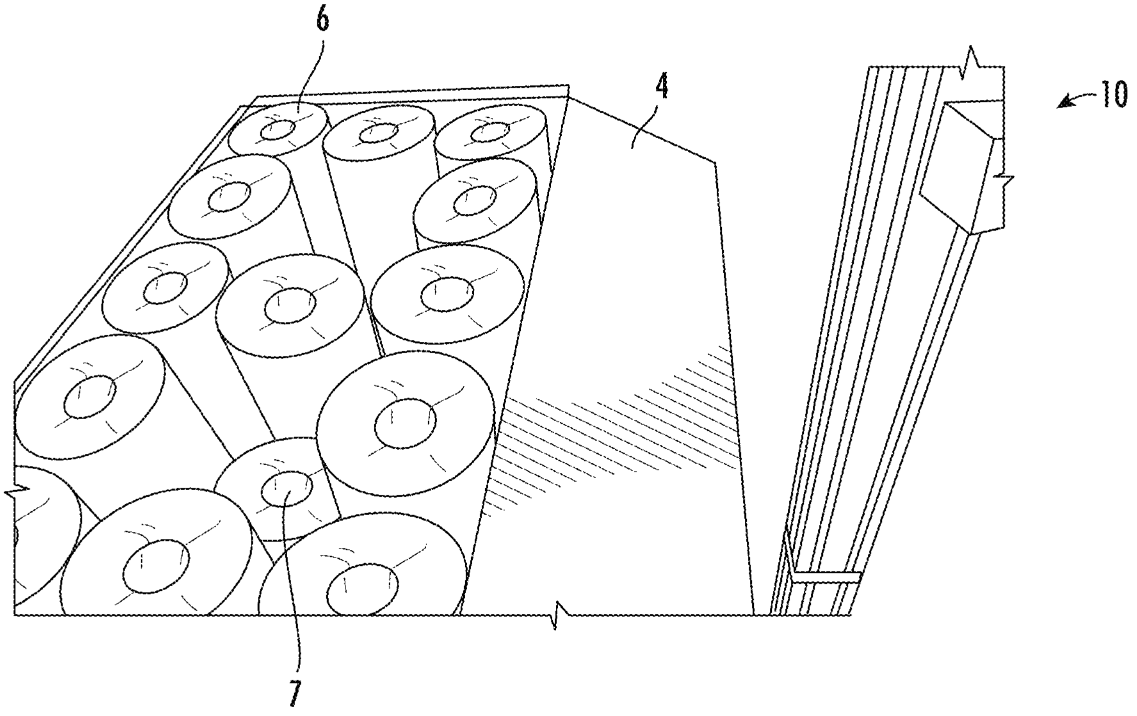
FIG. 5 illustrates a perspective view of a carton moving down a conveyor belt for scanning, in accordance with embodiments of the present disclosure.
Figure 6:
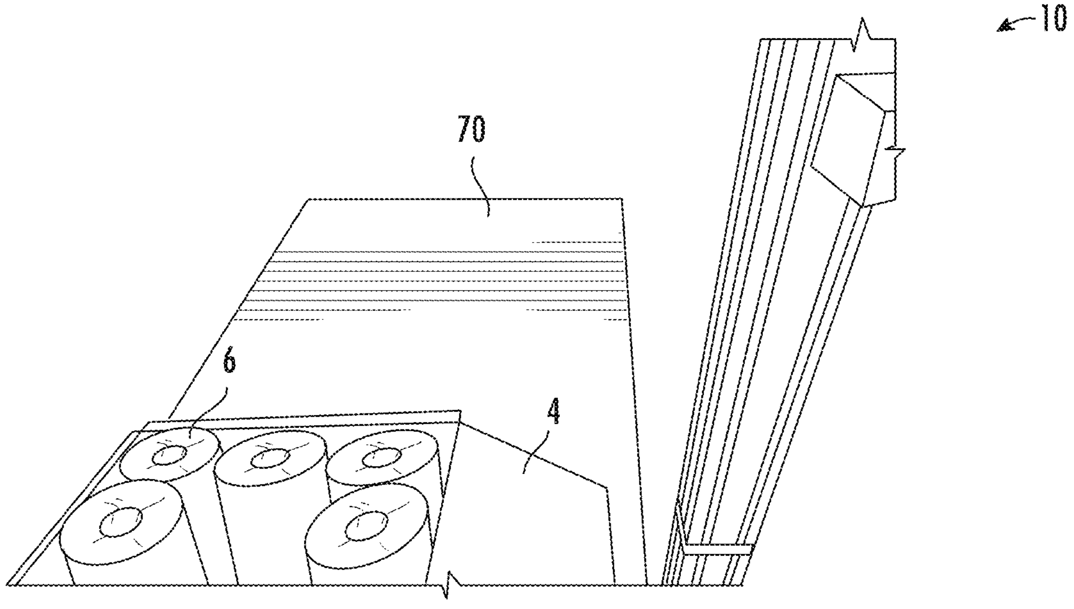
FIG. 6 illustrates a perspective view of a carton moving down a conveyor belt for scanning, in accordance with embodiments of the present disclosure.

FIG. 3 illustrates a process flow for using the void fill system 100, while FIGS. 4 through 6 illustrate the scanning of a carton 4 and/or its contents (e.g., products 6 and/or any fill material 2) and FIGS. 7 through 12 illustrate output from the void fill system 100 on a graphical user interface. As illustrated in block 302 of FIG. 3, the void fill system 100 scans a carton 4 using one or more sensors 110. In some embodiments, as illustrated in FIGS. 4 through 6, a carton 4 may be moving down a transport system 70 (e.g., conveyor, or the like) of a cartoning machine 1. The one or more sensors 110, as previously described herein may be a laser, LiDAR, a light curtain, a camera, or the like sensor. The one or more sensors 110 capture carton information (e.g., carton identifiers, or the like as will be described herein) from the carton 4, which is used by the void fill computer systems 230 for various purposes.

Figure 7:
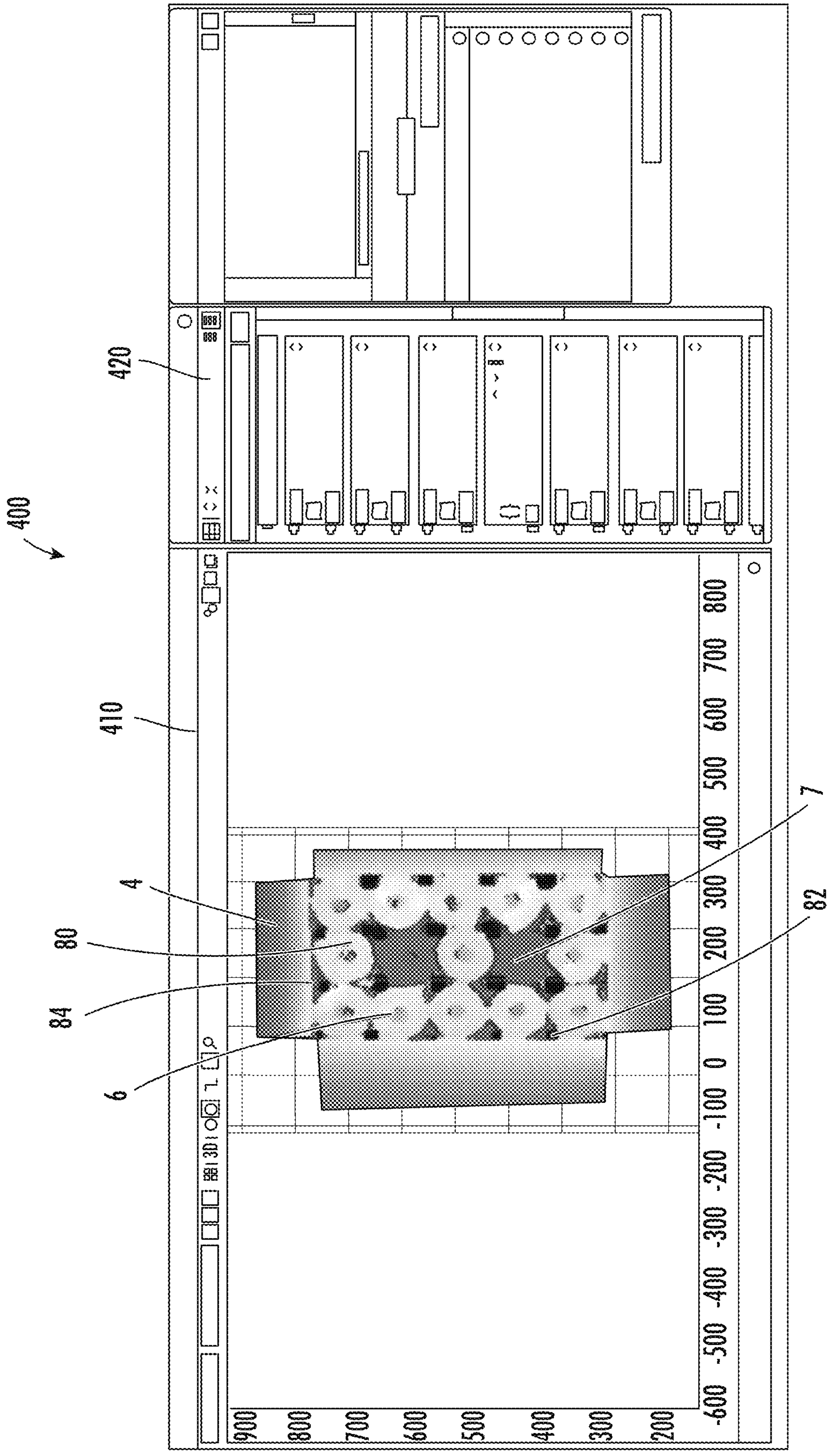
FIG. 7 illustrates output on a graphical user interface from void scanning of a carton, in accordance with embodiments of the present disclosure.
Figure 8:
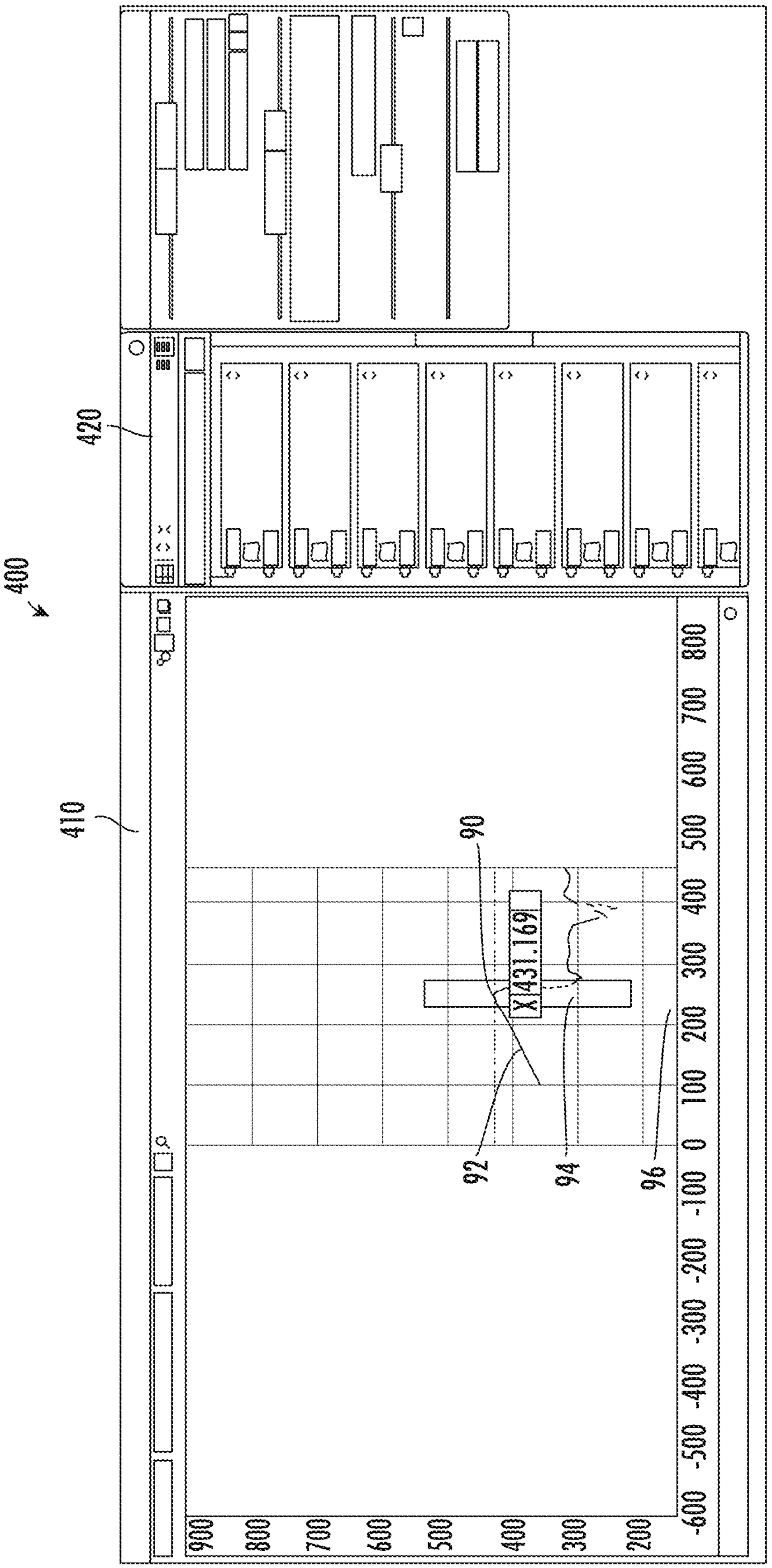
FIG. 8 illustrates output on a graphical user interface from void scanning of a carton, in accordance with embodiments of the present disclosure.
Figure 9:
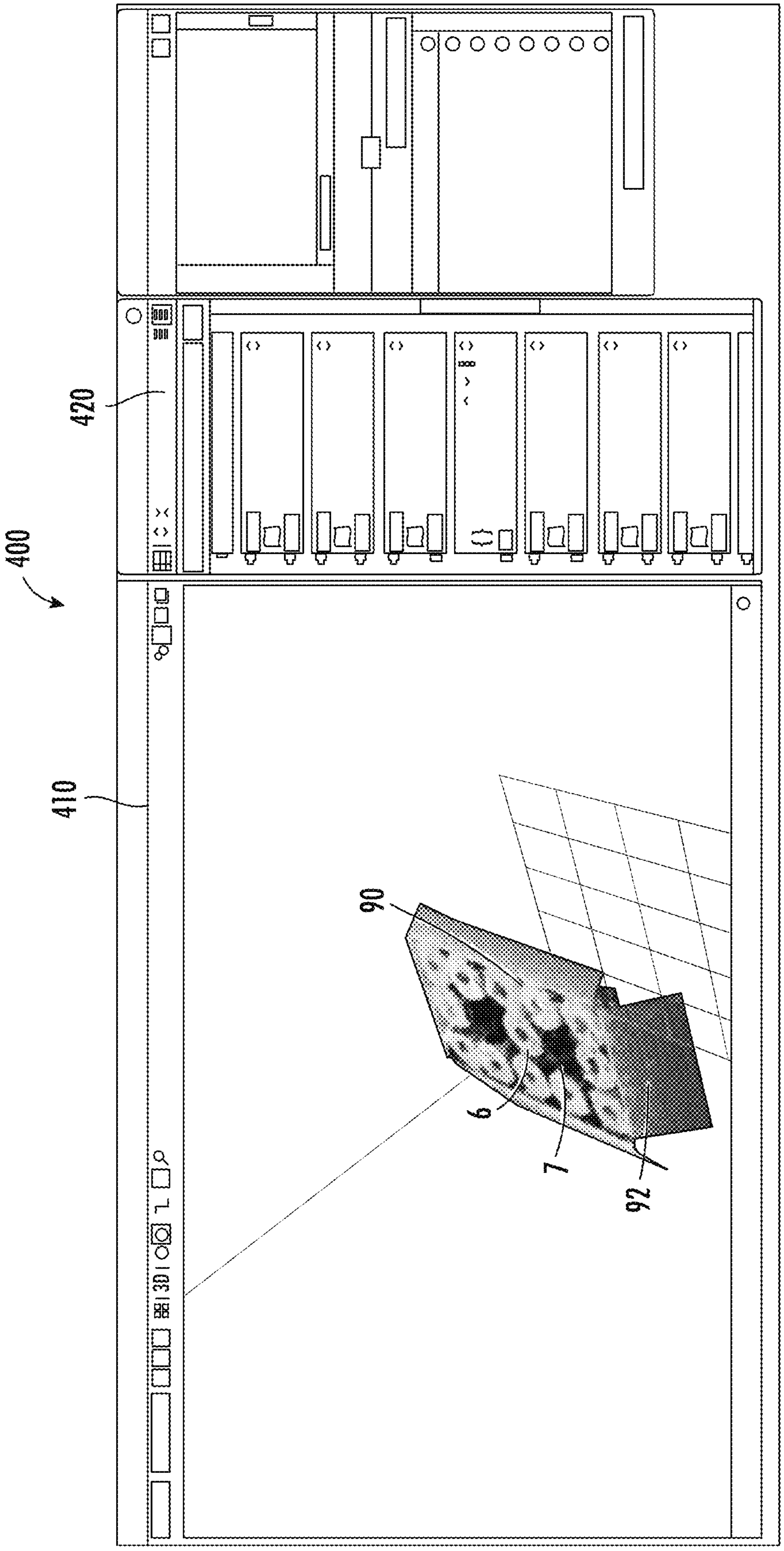
FIG. 9 illustrates output on a graphical user interface from void scanning of a carton, in accordance with embodiments of the present disclosure.
Figure 10:
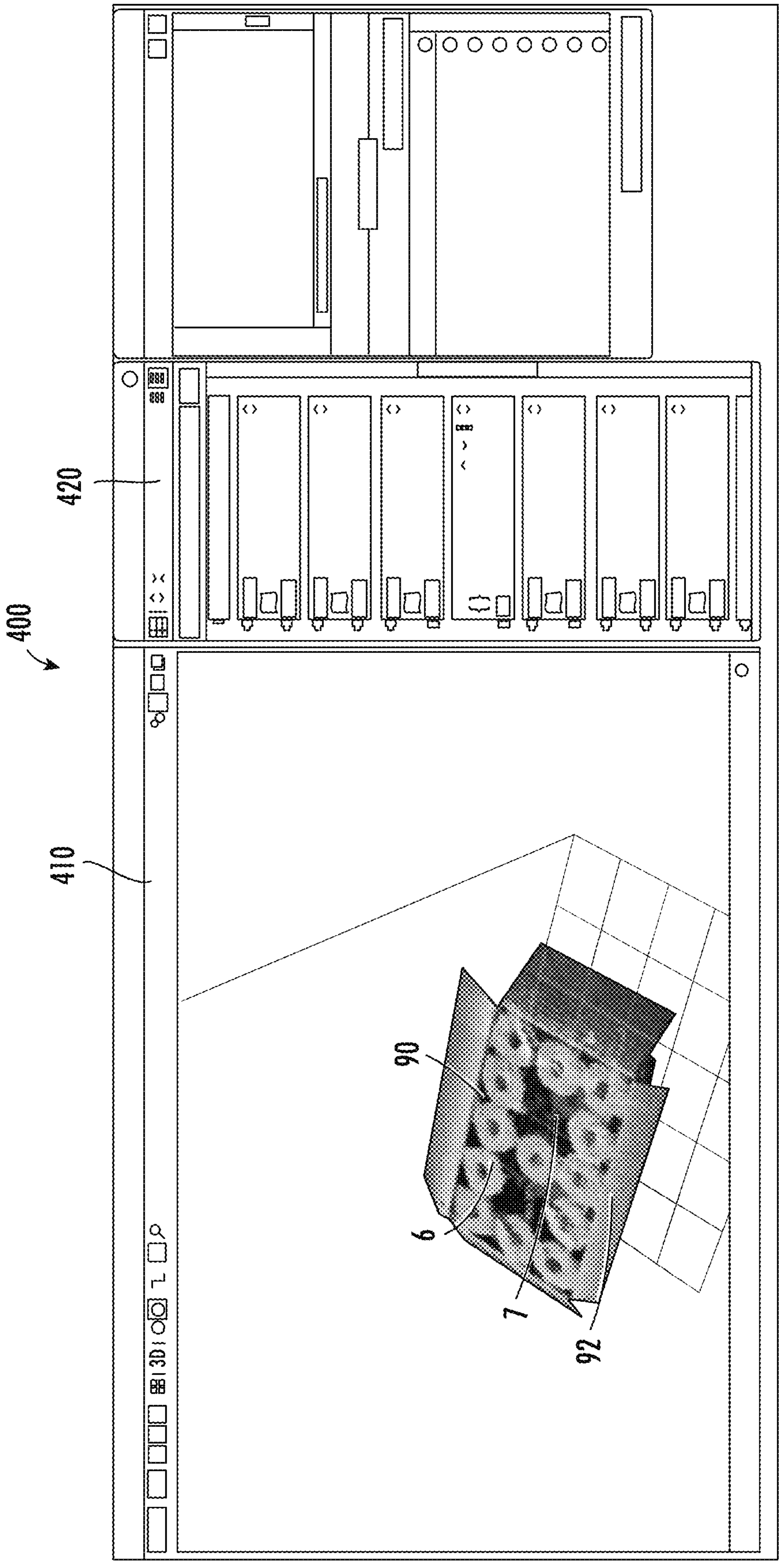
FIG. 10 illustrates output on a graphical user interface from void scanning of a carton, in accordance with embodiments of the present disclosure.
Figure 11:
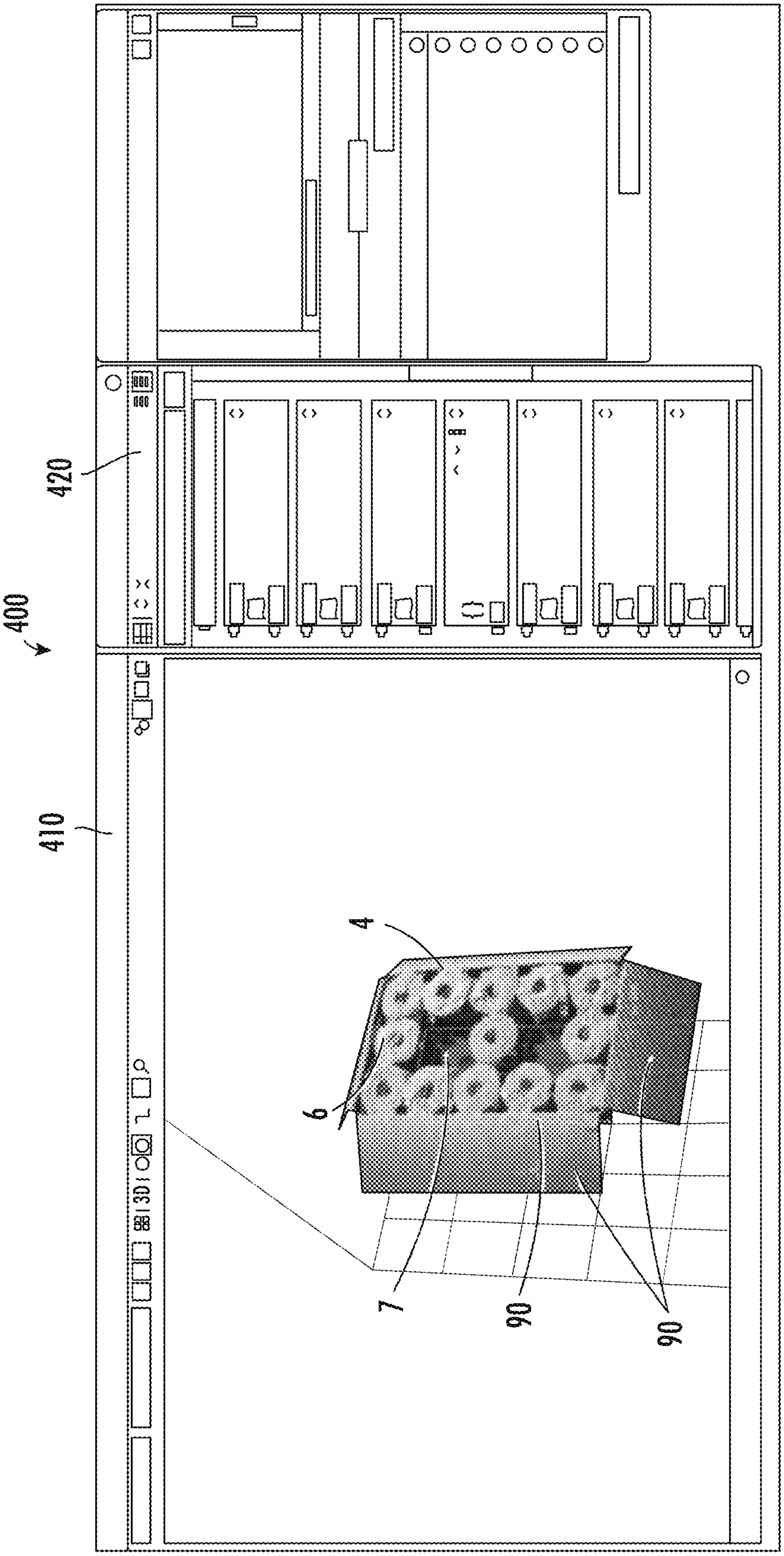
FIG. 11 illustrates output on a graphical user interface from void scanning of a carton, in accordance with embodiments of the present disclosure.
Figure 12:
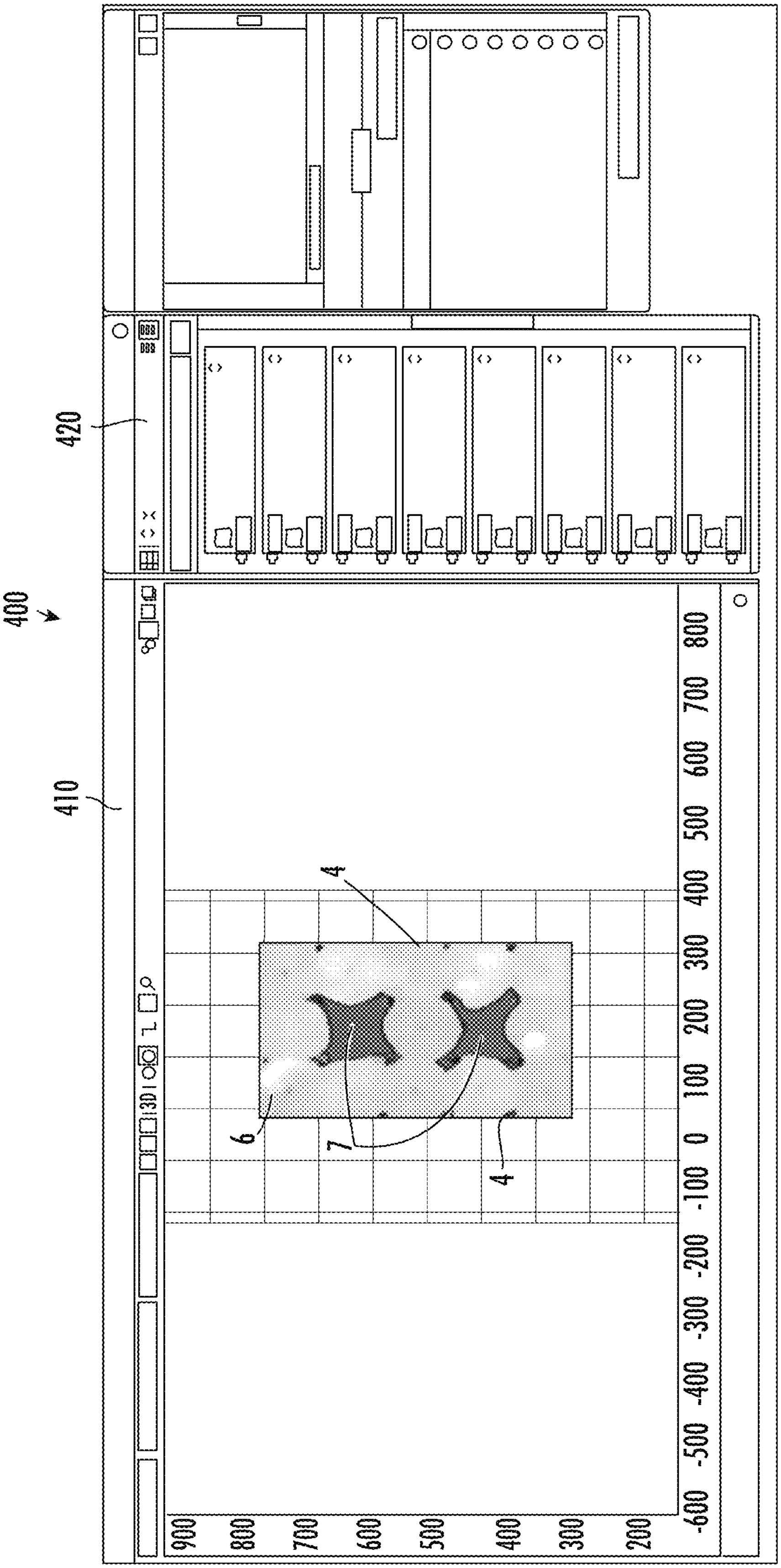
FIG. 12 illustrates output on a graphical user interface from void scanning of a carton, in accordance with embodiments of the present disclosure.

Blocks 304 through 308 illustrate how the void fill system 100 may identify the carton 4 used within the cartoning machine 1. For example, as illustrated in block 304 of FIG. 3, a carton 304 within the cartoning machine 1 may be identified by determining carton information (e.g., the length, width, and/or height) of the carton 4, using the one or more sensors 110. It should be understood that the one or more sensors 110 may include cameras, lasers (e.g., 3D smart laser), LiDAR, light scanners (e.g., light curtains, or the like), or other like scanners. The LiDAR (or other sensor) may take an overhead scan of the carton 4 and identify the opening 80 of the carton 4, as illustrated in FIG. 7. In some embodiments, the void fill application 237 may determine the length 82 and width 84 of the opening 80 when the carton 4 is square or rectangular. In other embodiments, the opening 80 of the carton 4 may be another shape (e.g., circular, oval, triangular, other polygonal shape, non-uniform shape, or the like) and the void fill application 237 identifies an area of the opening. Furthermore, the one or more sensors 110 (e.g., one or more height scanners) may determine the height of the carton 4. For example, the one or more sensors 110 may scan a profile of the carton 4. As illustrated in FIG. 8, from the scan of the profile of the carton 4, the void fill application 237 identifies a position of one or more flap folds 90 between a flap 92 and a wall 94 of the carton 4. In order to determine the flap fold location, the void fill application 237 determines when the height of the carton 4 changes (e.g., drops off), which indicates the location of a flap 90 of the carton 4. As such, the height 86 of the carton 4 may be determined from the lowest portion of the profile of the carton 4 (e.g., bottom edge 96 of the carton 4, location of the surface on which the carton 4 sits, or the like) to the flap folds 90 (e.g., point at which the upper surface drops off indicating the fold of the flap 90). The void fill system 100 (e.g., the void fill application 237) may take an average of the height from different flap locations in order to account for any tolerance differences in the measurements. It should be understood that the process of block 304 may be used to identify any type of carton 4, including unique cartons 4 that may be used in the cartoning machine 1. That is, the process of block 304 may be used when the packing process uses random cartons, in random orders, and/or for random product(s).

As illustrated in block 306, in some embodiments one or more dedicated cartons 4 may be identified by the void fill system 100. For example, in some embodiments, the void fill application 237 and/or cartoning computer systems 210 may be pre-programed with one or more dedicated cartons 4 and one or more carton identifiers, which may be used for packaging one or more products 6. As such, in some embodiments, the one or more sensors 110 may be able to determine the carton 4 to be packaged through the use of the carton identifier. The carton identifier may be a barcode, QR code, RFID tag, a single dimension of the carton 4 (e.g., height, width, length), indicia (e.g., characters-letters, numbers, symbols, logos, pictures, or the like), or any other type of carton identifier may be used to determine carton information (e.g., material, size, dimensions, closing properties, or the like). As such, when a carton identifier is scanned by the one or more sensors 110, the associated carton information may be identified. In other embodiments, the dedicated cartons 4 and carton information may be inputted into the void fill application 239 as being associated with one or more products 6, such that when the one or more products 6 is selected for packaging (e.g., by a user selecting a product, when the cartoning machine 1 automatically selects the product, or the like), the carton 4 for the one or more products 6 is automatically selected from a plurality of cartons 4. Consequently, the carton volume may be stored carton information or may be determined from stored carton information (e.g., from stored height, width, length, or the like of the carton) in response to identifying the carton 4.

As further illustrated by block 308 of FIG. 3, in some embodiments a redundant carton 4 may be utilized for packing the one or more products 6. For example, for a run of products 6 (e.g., 10, 50, 100 or the like products) that are the same or similar, a redundant carton 4 may be used. As such, in some embodiments, the void fill application 237 and/or the cartoning application 237 may receive the carton information for the redundant cartons 4 from a user 204 and/or from stored carton information in the void fill computer systems 230 and/or the cartoning computer systems 210 (e.g., the applications 237, 217 thereof). Consequently, the volume of the redundant carton 4 (e.g., maximum volume) may be stored carton information and/or may be determined from stored carton information (e.g., length, width, height, or the like).

Block 310 of FIG. 3 illustrates that based on the cartons 4 identified, as previously discussed above with respect to blocks 304 to 308 (or through another process), the carton volume of the cartons 4 are identified. For example, the carton volume can be calculated by the height, length, and width from the scan discussed in block 304, from the dedicated carton 4 (e.g., from stored carton information for the dedicated cartons 4), from a redundant carton (e.g., from stored carton information for a redundant carton 4), or the like. It should be understood that the volume for a carton 4 may be stored as carton information or may be calculated based on other stored carton information. The carton volume may be a maximum carton volume should the carton 4 be completely filled. However, in some embodiments the carton volume may be a percentage of the maximum carton volume (e.g., a volume that has a factor of safety built-in to account for any potential measurement tolerance issues, or the like).

Block 312 of FIG. 3 further illustrates that a current carton volume (e.g., also described as a content volume) of a carton 4 may also be determined. In some embodiments, the current volume (i.e., the content volume) is determination of the one or more products 6 that are in the carton 4, any pre-fill material that might have already been added to the carton 4 before adding the products 6, and/or the any void fill material has already been added to the carton 4 after the products 6. In some embodiments, the current volume may be determined by the one or more sensors 110 from the original scan described in block 302. However, in other embodiments, an additional scan may be performed on the carton 4 after the product 6 is packaged in the carton 4 and/or after the void fill material has been added to the carton 4. The current carton volume may be determined based the one or more sensors 110, which in some embodiments is the LiDAR sensor. The LiDAR sensor may identify the location of the surfaces of the one or more products 6, any pre-filled void fill material already in the carton 4, and/or after the final void fill material has been added to the carton 4. The void fill application 237 may use the location of the surfaces of the contents (e.g., products, pre-fill, void fill, or the like) of the carton 4 to calculate the volume below the surfaces identified by LiDAR. However, in other embodiments other processes may be used to identify the current carton volume.

FIG. 3 further illustrates in block 314 that a carton void is determined based on the carton volume (e.g., maximum carton volume, or the like) and/or the current carton volume (e.g., content volume). In some embodiments, the carton void is determined as the difference between the carton volume and the current volume, which may be adjusted by an amount (e.g., a percentage, or the like).

Block 316 illustrates that the void fill system 100 (e.g., a void fill application 237 of the void fill computer system 220) may identify one or more void fill recipes in order to determine how to fill the carton void and/or improve the packaging process. In some embodiments, the void fill recipe may be used to recommend void fill material (e.g., fill type, fill amount, or the like) based on the carton void (e.g., difference between the carton volume and the current volume of the carton 4, or the like). However, the void fill recipe may be determined based on a number recipe characteristics, such as the suppler packing the carton, the customer receiving the carton 4, the void fill type (e.g., air pillows, air bubbles, paper cushioning, peanuts, or the like), the carton type (e.g., hard shell, corrugated box, flexible package, or the like), product information (e.g., pre-packaged product, product type, product size, hot product, cold product, or the like), shipping information (e.g., carrier, estimated travel time, travel location, or the like) or other like recipe characteristics. It should be understood that in some embodiments the recipe determined may be based on stored recipes determined from the organization's experience with past suppliers, customers, cartons, products, fill material, or the like from past implementations of the void fill systems 100. In other embodiments, the void fill recipe may be set by the suppler, customer, third-parties (e.g., government regulations, or the like), or other like entities.

With respect to the recipe characteristics, a supplier preference may be to include an amount of void fill for a particular carton void (e.g., fill 75% of a calculated void, or the like) alone or in combination with other characteristics (e.g., for particular types of products). The customer preferences may include an amount a void fill for a particular customer (e.g., customer A may require 90% fill of a carton void, while customer B may require 70% fill of a carton void). The fill type characteristic may include providing different fill amounts if the fill material is an air pillow (e.g., X amount of air pillows because they are not compressible) verses if the fill material is paper cushioning (e.g., Y amount of paper cushioning because it is more compressible). The carton type characteristic may include providing less fill material for a carton 4 that has thicker walls, and more fill for a carton 4 that has thinner walls. The product information characteristic may include providing less fill material if the product is already pre-packaged and more fill material if the product is a loose product, more fill material if the product is fragile and less fill material if the product is firm, or more fill material if the product is heavy and less fill material if the product is light. The shipping information characteristic may include providing more fill material for longer shipping distances and/or times and less fill material for shorter distances and/or times. The recipes may be determined based on experience of the organization providing the void fill system 100, the supplier of the products, the customer of the produces, or other third-party entities (e.g., government requirements, industry standards, or the like).

As such, after a determination of the recipe, the process may proceed in different ways based on how the void fill system 100 is implemented. In some embodiments, as illustrated in block 318, the information determined from the scan (e.g., carton void, or the like) and/or stored recipes may be used to create a new recipe or alter a current recipe. For example, if the scan occurs for a new carton 4, a new product or combination of products, a new supplier, a new customer, or the like, a proposed recipe may be identified as a new recipe for a particular combination. As such, the recipe may be stored for the particular combination identified for use in the future (e.g., when the same or similar combination of characteristics is identified). Alternatively, the proposed recipe may be used in order to provide recommendations for filling a carton 4 (e.g., for filling a carton that has not received the final void fill material, changing the fill material for carton 4 in the future, or the like).

As illustrated in block 320, in some embodiments a notification may be sent to a user 204 (e.g., of the supplier, of the void fill system operator, or the like) regarding the recipe for packaging a carton 4. The notification may occur for specific products 6, customers, suppliers, cartons 4, or the like. The notification may occur in real-time to a graphical interface of a system (e.g., a cartoning computer system 210, a user computer system 220, a void fill computer system 230, void dispenser system, or the like) so that a user 204 packaging a product may receive recommendations for the void fill material to include in the carton 4 (e.g., void fill material types, amounts, or the like). However, the notification may occur after the void fill system 10 (e.g., organization operating the void fill system 100) has analyzed the output of the void fill system 100 and is providing a recommendation to the supplier regarding the packaging process for one or more products 6. For example, the notification may include recommendations for decreasing or increasing the void fill, increasing or decreasing the products 6 to be included in a specific carton 4, using a different carton 4 for particular products 6, or the like. As such, the notification may occur instantaneously, or may occur after analysis of one or more scans of the carton 4 (e.g., scan before products are included, scan after products are included, scan after void fill material is included, or the like).

As further illustrated in block 322, in some embodiments, after the determination of the recipe, the void fill system 100 may communicate with one or more systems of the cartoning machine 1 (e.g., the cartoning computer systems 210, a void dispenser system, or the like) in order to instruct a void fill dispenser to automatically dispense a void fill material, which may be manually placed in the carton 4 by a user 204, or may be automatically dispensed into the carton 4. As such, it should be understood the void fill systems 100 may be used in different ways depending on the preferences of the users of the void fill systems 100 and/or the capabilities of the cartoning machine 1 with which the void fill system 100 will operate.

FIGS. 7 through 12 illustrate some embodiments of the output provided by the void fill systems 100. The output may include a display 400 on a graphical user interface (GUI). The display 400 may include an image section 410 that provides 2D and/or 3D representations of the carton 4, the one or more products 6 in the carton 4, and/or the fill material in the carton 4. In some embodiments the 3D representation may be manipulated by a user 4 (e.g., rotated to view the representations form different angles). The display 400 may also include a carton information section 430 that provides data regarding the carton 4 and/or carton information, such as carton volume, current carton volume, carton void information, product information, void fill material information, recipe information, or the like. The output in the display 400 may be provided in real-time (e.g., immediately, near real-time, or the like) to an interface of any of the systems described herein. As such, the output in the display 400 may be utilized by a user 204 to provide recommend recipes for the current and/or future packing process for a carton 4, for recommended changes to the packaging process, for automatic dispensing of fill material, or the like as previously described herein. It should be understood that the output and/or the display 400 illustrated in FIGS. 7 through 12 are examples, and the output and/or display 400 may be provided in different forms not specifically illustrated in the figures.

In other embodiments of the invention, the void fill computer systems 230, or other systems described herein, may perform other functions, instead of or in addition to the functions previously discussed herein. For example, in some embodiments, a scan of the carton 4 after the one or more products 6 have been packaged into the carton 4 may aid in confirming that the products were packaged into the carton 4 and/or that the products that were packaged into the carton 4 were the correct products 6. For example, the one or more sensors 110 (e.g., camera, RFID, optical readers, laser scanners, LiDAR, code reader, or the like) may be able to determine a product identifier (e.g., similar to or the same as how the carton 4 is identified) from the scan. The product identifier may be captured by reading characters (e.g., codes), images, or the like on the product package, capturing electronic information from the package, using RFID tags, capturing the size of the product (e.g., length, width, height, diameter, or the like), or the like. The determination of the actual product 6 packaged in the carton 4 (e.g., using the product identifier, or the like) may be compared against the product 6 that was supposed to be packaged (e.g., based on indication from the product supply systems, or other systems, that indicate what product 6 was supposed to be supplied for packaging). In some embodiments, a notification may be provided to a user (e.g., worker packing the carton, quality control, or the or the like) and/or system regarding whether or not the product 6 was packed and/or if the correct product was packed. The notification may occur in real-time (e.g., in real-time, or near real-time), before the product is sealed, before the product is shipped, or after the product is shipped (e.g., for troubleshooting, process correction, or the like).

In other embodiments of the invention, the configuration of the one or more products 6 (e.g., how the products are packed) in the carton 4 may be captured using the one or more sensors 110. Moreover, a notification may be sent to a user (e.g., worker, analysis, or the like) in real-time and/or at a later point in order to provide recommended reorganization of the products 6 in the carton 4. For example, the notification for the recommended product configuration can be made in real-time to a user (e.g., worker, or the like) to allow the user to repackage the products 6 in the carton 4. Additionally, or alternatively, the notification may occur at a later point in time after a recipe has been determined for the configuration of the product(s) 6 in the same or a different carton 4. In some embodiments, the recommendation may include packaging the products 6 in a larger or smaller carton 4, switching the carton type (e.g., changing from a box to a mailer, vice versa, or the like), determining that the product 6 may be designated for shipping in its original container (SIOC) (e.g., shipping in the original packaging without using another carton 4), or the like.

It should be further understood that in some embodiments, images of the carton 4, product 6, and/or packed carton 4 (e.g., photo image, IR image, LiDAR image, or the like image) may be captured and stored for later use (e.g., for determining recipes, recommendations, notifications, or the like). In some embodiments, the images may be taken of each carton 4 being packed, random cartons (e.g., for quality control, or the like), specific cartons 4, or the like. In some embodiments, the images are captured in particular situations when the packing of the product 6 in the carton 4 does not meet one or more thresholds. For example, an image may be captured when the product 6 is located below or above a threshold level of the carton 4, when the current carton volume is less than or greater than a current carton volume threshold, when the amount of fill material is below or above a threshold volume, the carton information, the product information, or the like fails to meet carton information thresholds, product information thresholds, or for other like reasons.

The present invention provides improvements over traditional systems, in that the scanning process that determines the carton information, which includes the carton volume or is used to determine the carton volume, and/or the process that determines the current carton volume does not require the carton 4 to be in a particular orientation. That is, the sensors 110 allow for scanning of the carton 4 regardless of orientation. Moreover, the present invention can be incorporated into any type of packaging process, such as a manual process, a semi-automated process, or a fully automated process. The present invention allows for operation of the void fill system 100 with unique cartons, dedicated cartons from a plurality of available cartons, and/or redundant cartons (e.g., the same cartons for an extended run). Furthermore, the present invention may be used for difference purposes, such as post-packaging analysis and recommendations (e.g., for cartons, products in cartons, product configuration in the cartons, fill material for carton voids, such as material type, material amount, or the like), real-time identification of fill material recommendations (e.g., fill material type and/or amount), automated dispensing of fill material from a void fill dispenser, or the like. As such, the flexibility of the present invention allows for implementation and use of the void fill system 100 with different type of carton machines 1, packaging stations, or the like. The system of the present invention can, but does not need to communicate with other packaging systems of the user (e.g., customer entity). That is, the void fill system 100 can operate as a stand-alone system that can detect the carton size, determine the void, and suggest the fill. Alternatively, the void fill system can integrate with customer systems to receive product 6, packaging, or the like information in order to provide recommended packaging to the customer. Additionally, the implementation of recipes that are based on the recipe characteristics described herein allow for improved efficiency, reduced damage to products 6, reduced costs (e.g., carton sizes, fill material, or the like reductions), increased customer satisfaction due to packaging the cartons 4 in accordance with customer preferences, or the like. Consequently, the void fill system 100 is customizable for any type of customer.

As will be appreciated by one of skill in the art in view of this disclosure, embodiments of the invention may be embodied as an apparatus, a system, computer program product, and/or other device, a method, or a combination of the foregoing. Accordingly, embodiments of the invention may take the form of an entirely hardware embodiment, an entirely software embodiment (including firmware, resident software, micro-code, or the like), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Several alternative examples have been described and illustrated herein. A person of ordinary skill in the art would appreciate the features of the individual embodiments and the possible combinations and variations of the components. A person of ordinary skill in the art would further appreciate that any of the examples could be provided in combination with the other examples disclosed herein. Additionally, the terms "first," "second," and "third" as used herein are intended for illustrative purposes only and do not limit the embodiments in any way.

As used herein, the singular forms "a", "an" and "the" are intended to include the plural forms as well, unless the context clearly indicates otherwise. It will be further understood that the terms "includes" and/or "including" when used herein, specify the presence of stated features, steps, operations, elements, and/or components, but do not preclude the presence or addition of one or more other features, steps, operations, elements, components, and/or groups thereof.

It will be understood that when an element is referred to as being "operatively coupled" (other similar phrase) to another element, the elements can be formed integrally with each other, or may be formed separately and put together. Furthermore, "operatively coupled" to can mean the element is directly engaged or operatively coupled to the other element, or intervening elements may be present between the elements. Furthermore, "operatively coupled" may mean that the elements are detachable from each other, or that they are permanently coupled together.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as top, bottom, front, rear, side, upper, lower, left, right, horizontal, vertical, upward, and downward merely describe the configuration shown in the figures. The referenced components may be oriented in an orientation other than that shown in the drawings and the terminology, therefore, should be understood as encompassing such variations unless specified otherwise. All structural and functional equivalents to the elements of the various aspects described throughout the disclosure that are known or later come to be known to those of ordinary skill in the art are expressly incorporated herein by reference and are intended to be encompassed by the claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, the subject matter lies in less than all features of a single disclosed configuration or operation. The claims are hereby incorporated into the detailed description, with each claim standing on its own as a separately claimed subject matter.

What is claimed is:

1. A material fill system, the system comprising:
- one or more sensors, wherein the one or more sensors comprise at least one or more image sensors;
- a display, wherein the display provides output regarding a packaging process; and
- a controller comprising:
  - one or more memory devices with computer-readable program code stored thereon; and
  - one or more processing devices operatively coupled to the one or more memory devices, wherein when executed the computer-readable program code is configured to cause the one or more processing devices to:
    - process a plurality of cartons for packaging by:
      - receiving a carton volume for a carton;
      - determining a carton void by scanning the carton with one or more products and capture one or more images of the carton with the one or more products using the one or more image sensors;
      - determining a void fill amount for the carton based on the carton void; and
      - sending a notification to dispense the void fill amount for the carton;
    - provide on the display the one or more images captured by the one or more sensors and store the one or more images captured;
    - send carton information for the plurality of cartons to a void fill computer system, wherein carton information comprises void fill percentage based on the carton void determined and the void fill amount for the plurality of cartons packaged; and
    - determine for one or more cartons of the plurality of cartons, via the void fill computer system, a recipe for future packaging, wherein the recipe is based at least on recipe characteristics comprising a supplier packing the carton, a customer receiving the carton, a fill type, a carton type, or product information, wherein the recipe comprises:
      - a recommended void fill amount, a recommended carton, and a recommended product configuration; and
      - an increase or decrease of the recommended void fill amount based on supplier preference or customer preference.

2. The system of claim 1, wherein the carton volume is a maximum fill volume of the carton.

3. The system of claim 1, wherein receiving the carton volume comprises:
- identifying a carton height, a carton length, and a carton width using the one or more sensors.

4. The system of claim 3, wherein identifying the carton height comprises:
- identifying a position of one or more flap folds between one or more flaps and one or more walls of the carton using one or more profile sensors of the one or more sensors; and
- identifying a distance between the one or more flap folds and a bottom edge of the carton or support surface on which the carton sits.

5. The system of claim 3, wherein identifying the carton length and the carton width comprises:
- identifying two or more edges of an opening of the carton using one or more overhead sensors of the one or more sensors; and
- identifying the carton length and the carton width based on a measurement of the two or more edges of the opening of the carton.

6. The system of claim 1, wherein receiving the carton volume comprises:
- identifying a carton identifier using the one or more sensors;
- accessing stored carton identifiers that correspond to the plurality of cartons;
- comparing the carton identifier with the stored carton identifiers; and
- identifying a dedicated carton as the carton and determining the carton volume for the dedicated carton when the carton identifier meets a stored carton identifier from the stored carton identifiers.

7. The system of claim 6, wherein the carton identifier may comprise a carton length, a carton height, a carton width, a carton tag, a carton label, a carton barcode, a carton QR code, a carton RFID tag, a carton character, or a carton color.

8. The system of claim 1, wherein receiving the carton volume comprises:
- receiving a redundant carton selection and determining the carton volume for the redundant carton.

9. The system of claim 1, wherein determining the carton void comprises taking a difference between the carton volume and a current carton volume and providing the current void fill amount based on the difference.

10. The system of claim 9, wherein determining the current carton volume comprises identifying a product volume for the one or more products in the carton using the one or more sensors.

11. The system of claim 9, wherein determining the current carton volume comprises identifying a pre-fill material volume for pre-fill material in the carton.

12. The system of claim 1, further comprises:
- a void fill dispenser system that receives the notification to dispense the void fill amount for the carton and dispenses the void fill amount to the carton.

13. The system of claim 1, wherein the recipe further comprises:
- an increase or decrease of the recommended void fill amount based on a thickness of walls of the one or more cartons.

14. The system of claim 1, wherein the recipe further comprises:

an increase or decrease of the recommended void fill amount based on a shipping time and/or a shipping distance associated with the one or more cartons.

15. The system of claim 1, wherein the recipe is based on a product type comprising a pre-packaged type, a loose type, a fragile type, a form type, a heavy type, or a light type.

16. The system of claim 1, wherein the customer preference comprises a first void fill threshold associated with a first customer, and second void fill threshold associated with a second customer different from the first void fill threshold.

17. The system of claim 1, wherein the one or more sensors comprise a camera, a laser, a light curtain, radar, LiDAR, infrared, a near-field communication device, or a RFID detector.

18. The system of claim 1, wherein providing on the display the one or more images captured by the one or more sensors comprises providing on the display:

an image of the carton with the one or more products captured by a camera; and a 3D representation of the carton with the one or more products captured by the 3D sensor.

19. The system of claim 1, wherein when executed the computer-readable program code is configured to further cause the one or more processing devices to:

provide on the display the carton information for the carton being processed.

20. The system of claim 1, wherein when executed the computer-readable program code is configured to cause the one or more processing devices to:

receive a new void fill amount or a new void fill percentage for one or more cartons of the plurality of cartons from a user computer system located remotely from the material; and process the plurality of cartons using the new void fill amount or the new void fill percentage for the one or more cartons of the plurality of cartons.

* * * * *